(12) United States Patent
Wei

(10) Patent No.: US 12,531,943 B2
(45) Date of Patent: Jan. 20, 2026

(54) EXERCISE-BASED CALL PROCESSING METHOD, APPARATUS, AND ELECTRONIC DEVICE

(71) Applicant: Huawei Technologies Co., Ltd., Shenzhen (CN)

(72) Inventor: Shuanglin Wei, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 550 days.

(21) Appl. No.: 17/914,642

(22) PCT Filed: Mar. 23, 2021

(86) PCT No.: PCT/CN2021/082432
§ 371 (c)(1),
(2) Date: Sep. 26, 2022

(87) PCT Pub. No.: WO2021/190509
PCT Pub. Date: Sep. 30, 2021

(65) Prior Publication Data
US 2023/0122690 A1    Apr. 20, 2023

(30) Foreign Application Priority Data
Mar. 27, 2020 (CN) .................. 202010230620.X

(51) Int. Cl.
*H04M 1/64* (2006.01)
*H04M 1/72454* (2021.01)

(52) U.S. Cl.
CPC ....... *H04M 1/645* (2013.01); *H04M 1/72454* (2021.01)

(58) Field of Classification Search
CPC ............ H04M 1/645; H04M 1/72454; H04M 1/724095; H04M 1/64; H04M 1/72484; H04M 1/72469
See application file for complete search history.

(56) References Cited

U.S. PATENT DOCUMENTS 3,787,626 A * 1/1974 Subieta ................. H04M 1/573
379/142.01
9,094,510 B2 * 7/2015 Rondeau ............... H04M 3/487
(Continued)

FOREIGN PATENT DOCUMENTS

CN    102833414 A    12/2012
CN    103354573 A    10/2013
(Continued)

*Primary Examiner* — Lisa Hashem
(74) *Attorney, Agent, or Firm* — Slater Matsil, LLP

(57) ABSTRACT

This application provides an exercise-based call processing method, an apparatus, and an electronic device, to intelligently process a call based on an exercise status of a user, which improves efficiency of interaction between the device and the user. The exercise-based call processing method may be applied to an electronic apparatus. The method includes: obtaining exercise data, detected by at least one sensor, of the user; determining the exercise status of the user of the electronic apparatus, where the exercise data is used to represent a current exercise status of the user; and when a system in which the electronic apparatus is located receives the call, determining, based on a determined current exercise status of the user, a processing action corresponding to a current call, and performing the processing action.

18 Claims, 8 Drawing Sheets

(56) References Cited

U.S. PATENT DOCUMENTS

| | | | |
|---|---|---|---|
| 9,477,313 B2* | 10/2016 | Mistry | G06F 3/017 |
| 9,781,759 B2* | 10/2017 | Veikkolainen | H04W 8/005 |
| 9,800,718 B2* | 10/2017 | Kuang | H04W 52/0216 |
| 10,051,107 B1 | 8/2018 | Prasad et al. | |
| 10,324,536 B2* | 6/2019 | Erkkila | G06F 3/0484 |
| 10,863,277 B2* | 12/2020 | Reily | H04R 5/04 |
| 11,412,327 B2* | 8/2022 | Reily | H04R 29/001 |
| 11,446,551 B2* | 9/2022 | Munoz | G06F 1/324 |
| 2013/0326790 A1* | 12/2013 | Cauwels | A61B 5/02233 2/170 |
| 2014/0164040 A1* | 6/2014 | Sridharan | G06Q 10/063114 705/7.15 |
| 2015/0371215 A1* | 12/2015 | Zhou | G06F 3/041 705/64 |
| 2016/0213980 A1* | 7/2016 | Chen | A63B 71/0622 |
| 2017/0289787 A1* | 10/2017 | Yu | H04W 76/14 |
| 2018/0146080 A1 | 5/2018 | Li et al. | |
| 2018/0176363 A1* | 6/2018 | Kang | H04L 51/043 |
| 2018/0191891 A1 | 7/2018 | Zhao | |
| 2021/0067624 A1 | 3/2021 | Liang | |

FOREIGN PATENT DOCUMENTS

| | | |
|---|---|---|
| CN | 105072270 A | 11/2015 |
| CN | 105072294 A | 11/2015 |
| CN | 105142121 A | 12/2015 |
| CN | 105511609 A | 4/2016 |
| CN | 106161758 A | 11/2016 |
| CN | 106331364 A | 1/2017 |
| CN | 106657640 A | 5/2017 |
| CN | 108244781 A | 7/2018 |
| CN | 108712563 A | 10/2018 |
| CN | 111541812 A | 8/2020 |
| EP | 3419266 A1 | 12/2018 |
| JP | 5835106 B2 | 12/2015 |
| WO | 2019140775 A1 | 7/2019 |

\* cited by examiner

EXERCISE-BASED CALL PROCESSING METHOD, APPARATUS, AND ELECTRONIC DEVICE

CROSS-REFERENCE TO RELATED APPLICATIONS

This application is a National Stage of International Application No. PCT/CN2021/082432, filed on Mar. 23, 2021, which claims priority to Chinese Patent Application No. 202010230620.X, filed on Mar. 27, 2020. Both of the aforementioned applications are hereby incorporated by reference in their entireties.

TECHNICAL FIELD

The present invention relates to the field of communications technologies, and in particular to an exercised-based call processing method, an apparatus, an electronic device, and a computer-readable storage medium.

BACKGROUND

With the progress of science and technology, people are increasingly dependent on electronic communications devices. For example, more and more people wear smart communications watches to monitor their exercise and health. When people wear electronic devices for exercise, they tend to ignore calls because of their focus on the exercise. Even though a user perceives a call during exercise, manual processing is required if the user is willing to answer the call, rejects the call, or the like, which affects continuity of the exercise of the user. Besides, when people think that actively refusing to answer a call is an impolite behavior for the call party, they can only wait until the call party gives up making the call. In this case, receiving no reaction from the called party worries the call party. All the foregoing cases bring inconvenience to a user.

SUMMARY

In view of this, the present invention provides an exercise-based call processing method, an apparatus, a device, and a computer-readable storage medium, so that intelligent processing can be performed on a call based on an exercise status of a user, and efficiency of interaction between the device and the user can be improved.

Some implementations of this application provide an exercise-based call processing method. The following describes this application from a plurality of aspects. For implementations and beneficial effects of the following plurality of aspects, refer to each other.

According to a first aspect, this application provides an exercise-based call processing method, executed by an electronic apparatus, including: obtaining exercise data of a user detected by at least one sensor, where the electronic apparatus may include a mobile phone, a smart communications watch, a smart communications band, a chip, and the like, and the exercise data is used to represent a current exercise status of the user. For example, an arm or a body regularly swings when the user is running or swimming, and it may be identified, by using the exercise data such as a swing speed and a swing angle of the user, that the user is in a running state, a swimming state, or the like. The exercise data may be detected by using one or a plurality of combination sensors in an acceleration sensor, a gyroscope, a gravity sensor, or a positioning system. When receiving a call, a system in which the electronic apparatus is located determines, based on a determined current exercise status of the user, a processing action corresponding to a current call and performs the processing action. The call may include a call of a device, a voice call, a video call, and the like, and a corresponding action may be rejecting the call, sending a message to a number of a call party or answering the call. It can also be waiting for the call to end automatically based on a setting of the customer.

According to an implementation of this application, the electronic apparatus may detect the exercise data of the user, and when receiving the call, the electronic apparatus determines the exercise status of the user by using the exercise data, to intelligently process the call of the call party based on the exercise status of the user, which improves efficiency of interaction between the device and the user.

In a possible implementation of the first aspect, the electronic apparatus determines, based on the exercise data, whether the user starts exercising, and enables a call intelligent processing mode when determining that the user starts exercising. For example, the swing speed and the swing angle of the arm when the user is running may be different from the swing speed and the swing angle of the arm when the user is not running. When the sensor senses the swing speed and the swing angle of the arm of the user indicating that the user enters the running state, the electronic apparatus may automatically enable the call intelligent processing mode. In this way, when the user takes exercise, the processing action corresponding to the current call can be determined based on the current exercise status of the user, so that the user can avoid manually enabling the call intelligent processing mode, and user experience is improved.

In a possible implementation of the first aspect, when the system in which the electronic apparatus is located receives the call, the electronic apparatus determines, based on the current exercise status of the user, the action corresponding to the current call, specifically including: The electronic apparatus determines, based on the exercise status of the user, that the user is in a first status or a second status, where the first status indicates that the user is willing to answer the call, the second status indicates that the user is not willing to answer the call, and the exercise status may include continuity and pause of exercise of the user; and it may be further determined, based on the continuity and the pause of the exercise of the user, whether the user expects to answer the call or does not expect to answer the call. That is, continuous exercise of the user generally means that the user does not pay attention to the call, which may indicate that the user is not willing to answer the call. Regularity of the continuous exercise of the user may suddenly change. For example, the arm that is swinging regularly suddenly slows down after the user receives the call, or the speed is 0. In this case, it may be determined that a pause occurs, and it indicates that the customer may view the call party, and may answer the call or reject the call. When it is determined that the user is in the first status (the user is willing to answer the call), the call is automatically answered. When it is determined that the user is in the second exercise status (the user is not willing to answer the call), reply content preset by the user is automatically replied to the call party. In this way, the received call is processed intelligently based on determining a will of the user, and the user experience is further improved.

In a possible implementation of the first aspect, the user may preset and save the reply content for different call parties based on an actual situation. For example, contacts may be grouped into family members, friends, or colleagues. The electronic apparatus may identify a group to which the number of the call party belongs, and reply with a corresponding set message. Alternatively, the reply content for each contact may be edited, so that the call party can receive targeted reply content, which improves the user experience.

In a possible implementation of the first aspect, that the electronic apparatus determines, based on the exercise status of the user, that the user is in the first status, that is, the user is willing to answer the call specifically includes: determining, based on the exercise data of the user, whether the exercise status of the user is the pause that meets a preset requirement, where the pause meeting the preset requirement may be that the user stops exercising, or a speed of the exercise of the user decreases to a set requirement, or the like. For example, the user is running at an average speed of 4 meters/second. When receiving the call, the user stops running, and the speed is 0. This case is considered as the pause. Alternatively, a running speed of the user decreases to 2 meters/second in a specific period of time, and this case may also be considered as the pause. When it is determined that the exercise status of the user is the pause that meets the preset requirement, further determining whether pause time of the exercise of the user reaches preset time. When the pause time reaches the preset time, it is determined that the user is willing to answer the call. For example, when the preset time is 5 seconds, and the pause time of the user reaches 5 seconds, it is determined that the user is willing to answer the call, and the call is answered automatically, which can further improve a judgment of whether the user is willing to answer the call.

In a possible implementation of the first aspect, when the pause time of the exercise of the user does not reach the preset time, it is determined that the user is in the second status, that is, the user is not willing to answer the call. For example, when the preset time is 5 seconds, and the user enters the exercise status again after a pause of 4 seconds, it is determined that the user is not willing to answer the call. In this case, the call party may be replied to in a manner of sending information, so that the call party can learn a situation of the user in time, which brings good experience to both the user and the call party.

In another possible implementation of the first aspect, the determining, based on the exercise data of the user, whether the exercise status of the user is the pause that meets a preset requirement includes: The electronic apparatus determines whether the exercise data is greater than or equal to a preset threshold, and when the exercise data of the user is greater than or equal to the preset threshold, it is determined that the exercise status of the user is the pause.

In another possible implementation of the first aspect, the determining that the user is in the second status, that is, the user is not willing to answer the call further includes: determining, based on the exercise data of the user, whether the exercise status of the user is the continuous exercise meeting the preset requirement, where whether the exercise status of the user is the continuous exercise meeting the preset requirement may determine whether the exercise data is less than the preset threshold, and when the exercise data of the user is less than the preset threshold, determining that the exercise of the user is the continuous exercise. When it is determined that the exercise status of the user is the continuous exercise, it is determined that the user is in the second status, that is, the user is not willing to answer the call, and the preset reply content may be sent to the number of the call party as a message, to avoid worry or unpleasantness caused to the call party by directly rejecting or not answering the call.

According to a second aspect, this application provides an electronic apparatus, where the electronic apparatus may include a mobile phone, a smart communications watch, a smart communications band, a chip, and the like, and specifically including: at least one sensor, where the sensor may include one or more combination sensors in a gravity sensor, a gyroscope, an accelerometer, or a positioning system, the sensor is configured to obtain exercise data of a user, and the exercise data is used to represent a current exercise status of the user, for example, when the user is running or swimming, an arm or a body swings regularly, and it may be identified, by using the exercise data such as a speed and an angle at which the arm or the body swings, that the user is in a running state, a swimming state, or the like; a processor, configured to: when a system in which the electronic apparatus is located receives a call, determine, based on the current exercise status of the user, and perform a processing action corresponding to a current call. The call may include a call of a device, a voice call, a video call, and the like, and a corresponding action may be rejecting the call, sending a message to a number of a call party, or answering the call. It can also be waiting for the call to end automatically based on a setting of the customer.

According to an implementation of this application, the electronic apparatus may detect the exercise data of the user, and when receiving the call, the electronic apparatus determines the exercise status of the user by using the exercise data, to intelligently process the call of the call party based on the exercise status of the user, which improves efficiency of interaction between the device and the user.

In a possible implementation of the second aspect, the electronic apparatus determines, based on the exercise data, whether the user starts exercising, and when it is determined that the user starts exercising, enables a call intelligent processing mode. For example, the swing speed and the swing angle of the arm when the user is running may be different from the swing speed and the swing angle of the arm when the user is not running. When the sensor senses the swing speed and the swing angle of the arm of the user indicating that the user enters the running state, the electronic apparatus may automatically enable the call intelligent processing mode. In this way, when the user takes exercise, the processing action corresponding to the current call can be determined based on the current exercise status of the user, so that the user can avoid manually enabling the call intelligent processing mode, and user experience is improved.

In a possible implementation of the second aspect, the processor is specifically configured to: determine, based on the exercise status of the user, whether the user is in a first status or a second status, where the first status indicates that the user is willing to answer the call, and the second status indicates that the user is not willing to answer the call. When it is determined that the user is in the first status, that is, the user is willing to answer the call, answering the call automatically; and when it is determined that the user is in the second status, that is, the user is not willing to answer the call, preset reply content is automatically replied to the call party. For example, contacts may be grouped into family members, friends, or colleagues. The electronic apparatus may identify a group to which the number of the call party belongs, and reply a corresponding set message. Alternatively, the reply content for each contact may be edited, so that the call party can receive targeted reply content, which improves the user experience.

In a possible implementation of the second aspect, the processor is specifically configured to: determining, based on the exercise data of the user, whether the exercise status of the user is a pause that meets a preset requirement, where the pause that meets the preset requirement may be that the user stops exercising, or a speed of exercise of the user decreases to a set requirement, or the like. For example, the user is running at an average speed of 4 meters/second. When receiving the call, the user stops running, and the speed is 0. This case is considered as the pause. Alternatively, a running speed of the user decreases to 2 meters/second in a specific period of time, and this case may also be considered as the pause. When it is determined that the exercise status of the user is the pause meeting the preset requirement, further determining whether pause time of exercise of the user reaches preset time. When the pause time reaches the preset time, it is determined that the user is in the first status, that is, the user is willing to answer the call. For example, when the preset time is 5 seconds, and the pause time of the user reaches 5 seconds, it is determined that the user is willing to answer the call, and the call is answered automatically, which can further improve a judgment of whether the user is willing to answer the call.

In a possible implementation of the second aspect, the processor is further specifically configured to: when the pause time of the exercise of the user does not reach the preset time, determine that the user is in the second status, that is, the user is not willing to answer the call. For example, when the preset time is 5 seconds, and the user enters the exercise status again after a pause of 4 seconds, it is determined that the user is in the second status, that is, the user is not willing to answer the call. In this case, the call party may be replied to in a manner of sending information, so that the call party can learn a situation of the user in time, which brings good experience to both the user and the call party.

In another possible implementation of the second aspect, the processor, determines, based on the exercise data of the user, whether the exercise status of the user is the pause that meets the preset requirement, including: determining whether the exercise data is greater than or equal to a preset threshold, and when the exercise data of the user is greater than or equal to the preset threshold, determining that the exercise status of the user is the pause.

In a possible implementation of the second aspect, the processor is further configured to: determine, based on the exercise data of the user, whether the exercise status of the user is continuous exercise meeting the preset requirement; and when it is determined that the exercise status of the user is the continuous exercise, determine that the user is in the second status, that is, the user is not willing to answer the call.

In a possible implementation of the second aspect, that the processor determines whether the exercise status of the user is continuous exercise includes: determining, based on the exercise data, whether the exercise data of the user is less than the preset threshold, and when the exercise data of the user is less than the preset threshold, determining that the exercise of the user is the continuous exercise.

According to a third aspect, this application provides an electronic device, including one or more memories, one or more processors coupled to the memory, and one or more programs, where the one or more programs are stored in the memory; and the electronic device is configured to perform the method disclosed in the first aspect of the foregoing embodiments.

According to a fourth aspect, this application provides a computer-readable storage medium, where the computer-readable storage medium stores a computer program, and when the computer program is run by a processor, the processor is enabled to perform the method disclosed in the first aspect in the foregoing embodiments.

According to a fifth aspect, this application discloses a computer program product including instructions. When the computer program product runs on a computer, the computer is enabled to perform the method in the first aspect.

According to a sixth aspect, this application discloses a device, including a processor, a memory, and a communications module. The processor, the memory, and the communications module communicate with each other by using an internal link pathway, to transfer a control signal and/or a data signal, so that the device performs the method disclosed in the first aspect of the foregoing embodiments.

DETAILED DESCRIPTION OF ILLUSTRATIVE EMBODIMENTS

The following clearly and completely describes technical solutions in embodiments of this application with reference to accompanying drawings in embodiments of this application.

It may be understood that as used in this specification, a term "module" may be or include an application-specific integrated circuit (ASIC), an electronic circuit, a memory and/or a processor (shared, dedicated, or a group) that executes one or more software or firmware programs, combined logic circuits, and/or another appropriate hardware component that provides a described function, or may be a part of these hardware components.

It can be understood that, in embodiments of this application, the processor may be a microprocessor, a digital signal processor, a microcontroller, or the like, and/or any combination thereof. According to another aspect, the processor may be a single-core processor, a multi-core processor, or the like, and/or any combination thereof.

Figure 1:
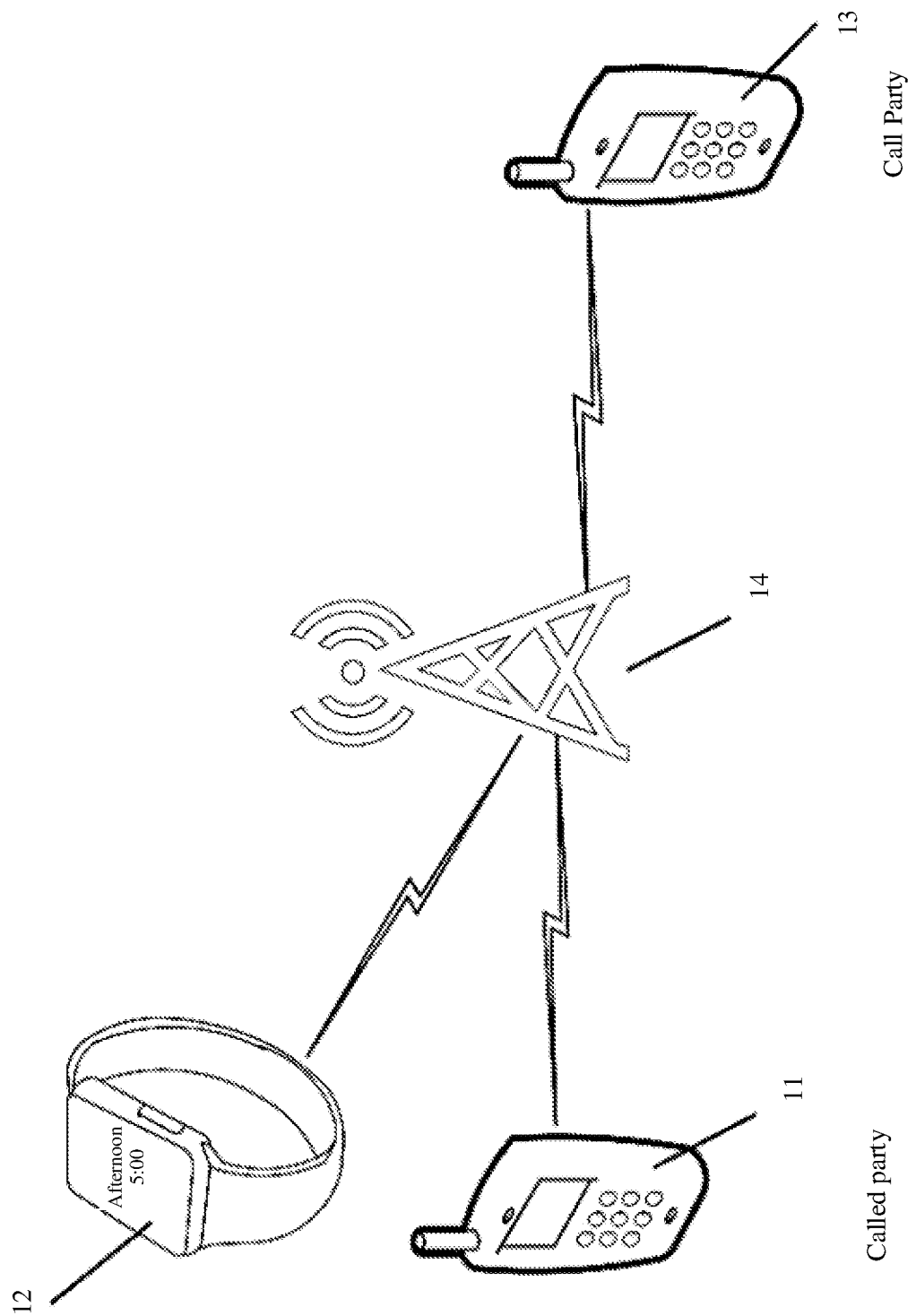
FIG. 1 is a schematic diagram of a structure of a system according to an embodiment of this application.

FIG. 1 is a schematic diagram of a structure of a system according to an embodiment of this application. The system may include at least two electronic apparatuses. In FIG. 1, three electronic apparatuses are used as an example: a mobile terminal 11 of a call party (a called party), a wearable device 12 (a called party), and an electronic apparatus 13 of a call party (a call party). The three electronic apparatuses may communicate with a network device 14 by using a wireless connection interface. That is, the mobile terminal 11 as a called party may perform a communication connection with the call party by using the network device 14, and the wearable device 12 as a called party may also perform the communication connection with the call party by using the network device 14. It should be noted that this application is applicable to the schematic diagram of the structure of the system shown in FIG. 1, but is not limited thereto.

An electronic apparatus in this application may be a device that can provide voice and/or data connectivity for a user, and the electronic apparatus may perform communication by using at least one core network or radio access network. The electronic apparatus may be an electronic apparatus, for example, a portable or wearable communications device such as a mobile phone, a smart communications watch, or a smart communications band. This is not limited herein.

A network device in this application may be a base station in a global system for mobile communication (Global System for Mobile Communication, GSM) or code division multiple access (Code Division Multiple Access, CDMA), or may be a base station (NodeB.NB) in wideband code division multiple access (Wideband Code Division Multiple Access, WCDMA), or may be an access point (Access Point, AP), a relay station, or the like in a WLAN, which is not limited herein.

An electronic device in this application may be a mobile phone, and a system in which the electronic apparatus is located may be the mobile phone; or the electronic apparatus is a chip, and the system in which the electronic apparatus is located is a mobile terminal in which the chip is located. This is not limited herein.

The following further describes embodiments of this application in detail with reference to the accompanying drawings.

Figure 2:
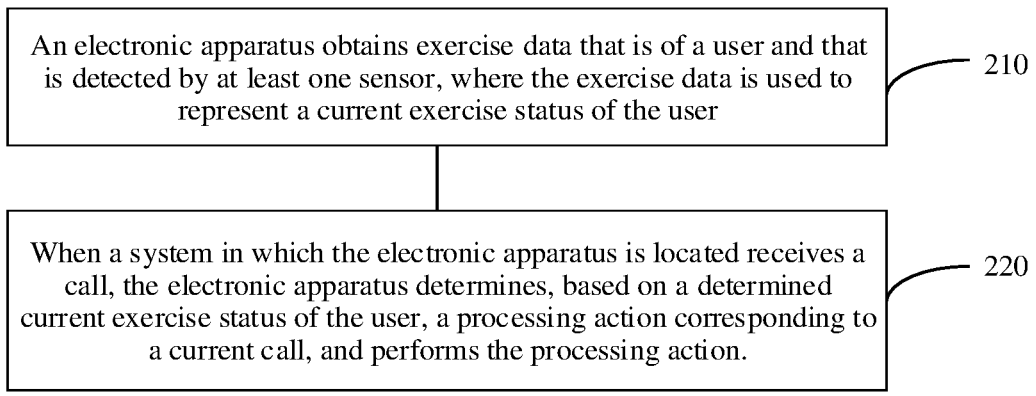
FIG. 2 is a flowchart of a call processing method during exercise according to an embodiment of this application.

Some implementations of this application disclose an exercise-based call processing method. FIG. 2 shows a flowchart of an exercise-based call processing method. The following describes the call processing method by using an electronic apparatus worn on a user as an execution body. As shown in FIG. 2, the call processing method includes the following steps.

Step S210: The electronic apparatus obtains exercise data that is of a user and that is detected by at least one sensor, where the exercise data is used to represent a current exercise status of the user. The sensor may be one or more combination sensors in an acceleration sensor, a gyroscope, a gravity sensor, or a positioning system. The exercise data that represents a current exercise status of the user may be obtained by using the sensor. For example, when the user is running, the electronic apparatus may detect the exercise data such as a (running) speed, an arm swing speed, and an arm swing angle of the user by using the sensor. Further, an exercise status of the user is determined based on the exercise data. The electronic apparatus monitors the data in real time and stores the exercise data. When the user stops running or slows down, the electronic apparatus may determine, based on a change in the exercise data, whether the user is in the exercise status such as stopping running, maintaining an original speed, or slowing down the speed.

Step S220: When a system in which the electronic apparatus is located receives a call, the electronic apparatus determines, based on a determined current exercise status of the user, a processing action corresponding to a current call, and performs the processing action. The corresponding processing action may include directly rejecting the call and then sending corresponding reply content to a call number, answering the call, or the like. For example, after the electronic apparatus receives the call, the current exercise status of the user is keeping running at a constant speed. In this case, the call may be rejected, and "I am running. Call you back later" is replied to a call party as an SMS message. The current call may be automatically processed based on the current exercise status of the user. This does not affect exercise of the user, and prevents the user from directly rejecting or not answering the call that makes the call party feel unpleasant or worried. Therefore, terminal intelligence can be improved, and user experience can be improved. In addition, the call in this application may include a common telephone call, a voice or video communication call, or the like. This is not limited herein.

It should be noted that exercise in this application may include running, swimming, mountain climbing, rock climbing, ball-related exercise, doing aerobics, and the like. This is not limited herein.

According to an embodiment of this application, an electronic apparatus determines, by using a sensor, whether a user starts exercising, and when it is determined that the user starts exercising, enables a call intelligent processing mode. For example, when the user starts running, the sensor of the electronic apparatus detects exercise data of running of the user, and determines that the user starts running. In this case, the electronic apparatus may automatically enable the call intelligent processing mode, and determine and execute, based on an exercise status of the user, a processing action corresponding to a current call. In this way, the user does not need to manually enable the call intelligent processing mode each time, and man-machine interaction efficiency is improved.

Figure 3A:
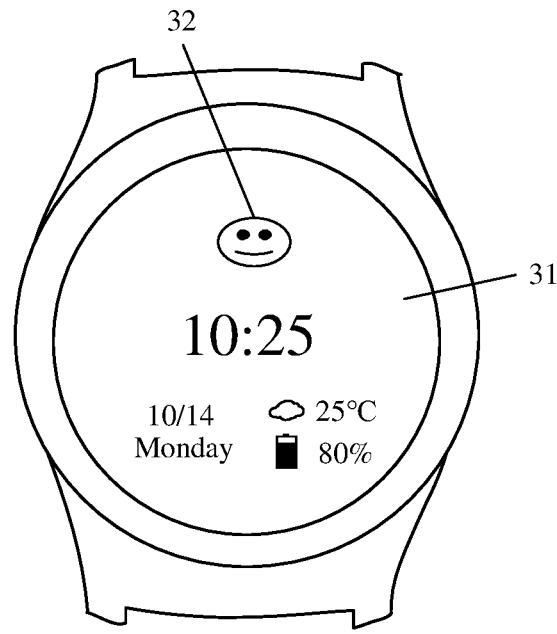
FIG. 3a is a schematic diagram of an interface for enabling a call intelligent processing mode according to an embodiment of this application.

FIG. 3a is a schematic diagram of an interface for enabling a call intelligent processing mode according to an embodiment of this application. As shown in FIG. 3a, an interface 31 is displayed when an electronic apparatus enables the call intelligent processing mode. A user may preset an exercise mode before exercising. When the electronic apparatus detects that exercise data of the user, such as a speed, an acceleration, an angular velocity, a height, and the like meets a preset condition, a preset exercise mode is enabled, for example, the exercise mode such as running, swimming, mountain climbing, or rock climbing. Running exercise is used as an example for description. A running speed of a person during running is usually more than three times a walking speed of the person during normal walking, and the walking speed of the person usually ranges from 1.75 m/s to 2 m/s. 1.75 m/s is used as a calculation standard.

When the electronic apparatus detects that the exercise data of the user is moving forward at a speed of 5.25 m/s, reaching a speed three times that of normal walking, it is determined that the user starts a preset running exercise mode. In this case, the call intelligent processing mode of the electronic apparatus is enabled, and an icon 32 of the call intelligent processing mode appears on a display bar of the interface 31 of the electronic apparatus. The user may learn, by viewing the icon 32, whether the call intelligent processing mode is enabled. After the electronic apparatus determines that the user stops exercising, for example, running, when the running speed of the user decreases from an average of 5.25 m/s to less than 2 m/s, it may be determined that the user stops running, the call intelligent processing mode is automatically disabled, and the icon 32 on the interface 31 of the electronic apparatus disappears.

Figure 3B:
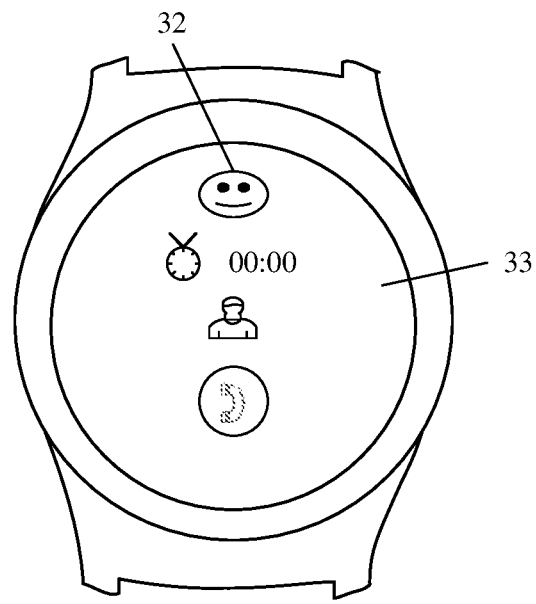
FIG. 3b is a schematic diagram of a call interface according to an embodiment of this application.

FIG. 3b is a schematic diagram of a call interface according to an embodiment of this application. As shown in FIG. 3b, after the call intelligent processing mode is enabled, the electronic apparatus receives a call. After automatically answering the call based on a current exercise status of the user by using the call intelligent processing mode, the electronic apparatus displays a call interface 33. The call interface 33 may display a profile picture of a call party, or may display a number of the call party, or the like, and display an in-call state. In this case, a called party and the call party can talk directly. After the call is answered, the call intelligent processing mode is still in an enabled state, and the user may still see the intelligent processing mode icon 32. In this case, the electronic apparatus may continue to monitor the exercise data of the user. When it is determined that the user stops the current exercise state (running), the call intelligent processing mode is automatically disabled, and the icon 32 on the interface 33 of the electronic apparatus disappears. In addition, the electronic apparatus may also be connected to a playback device such as a Bluetooth headset of the called party, to facilitate call answering of the user.

Figure 3C:
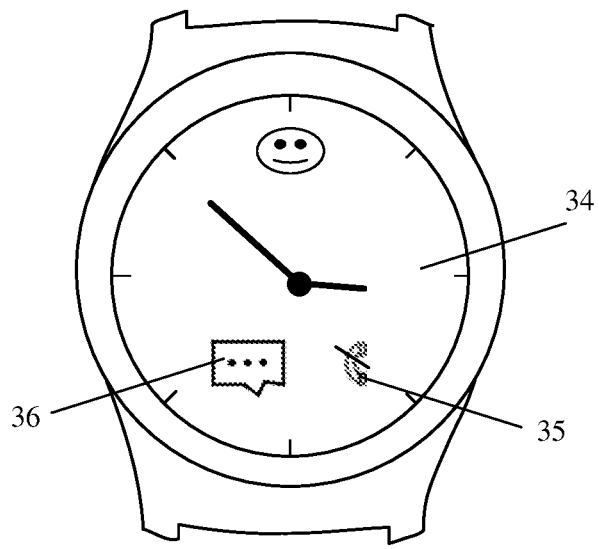
FIG. 3c is a schematic diagram of an interface of rejecting a call according to an embodiment of this application.

FIG. 3c is a schematic diagram of an interface of rejecting a call according to an embodiment of this application. As shown in FIG. 3c, after the call intelligent processing mode is enabled, the electronic apparatus receives the call. After automatically rejecting the call based on the current exercise status of a user, the electronic apparatus displays a call rejection interface 34. A missed call icon 35 is displayed on the interface 34, to remind the called party of a missed call. When there are a plurality of missed calls, a corresponding Arabic numeral is marked on the top right of the missed call icon 35. In addition, the electronic apparatus obtains the number of the call party, sends, to the number of the call party, reply content preset by the called party, and displays, on the call rejection interface 34, an icon 36 for sending a message. The user may tap the icon 36 to view content sent. A representation form of an icon in this application is merely an example for description, and may have another representation form. This is not limited herein.

Figure 4:
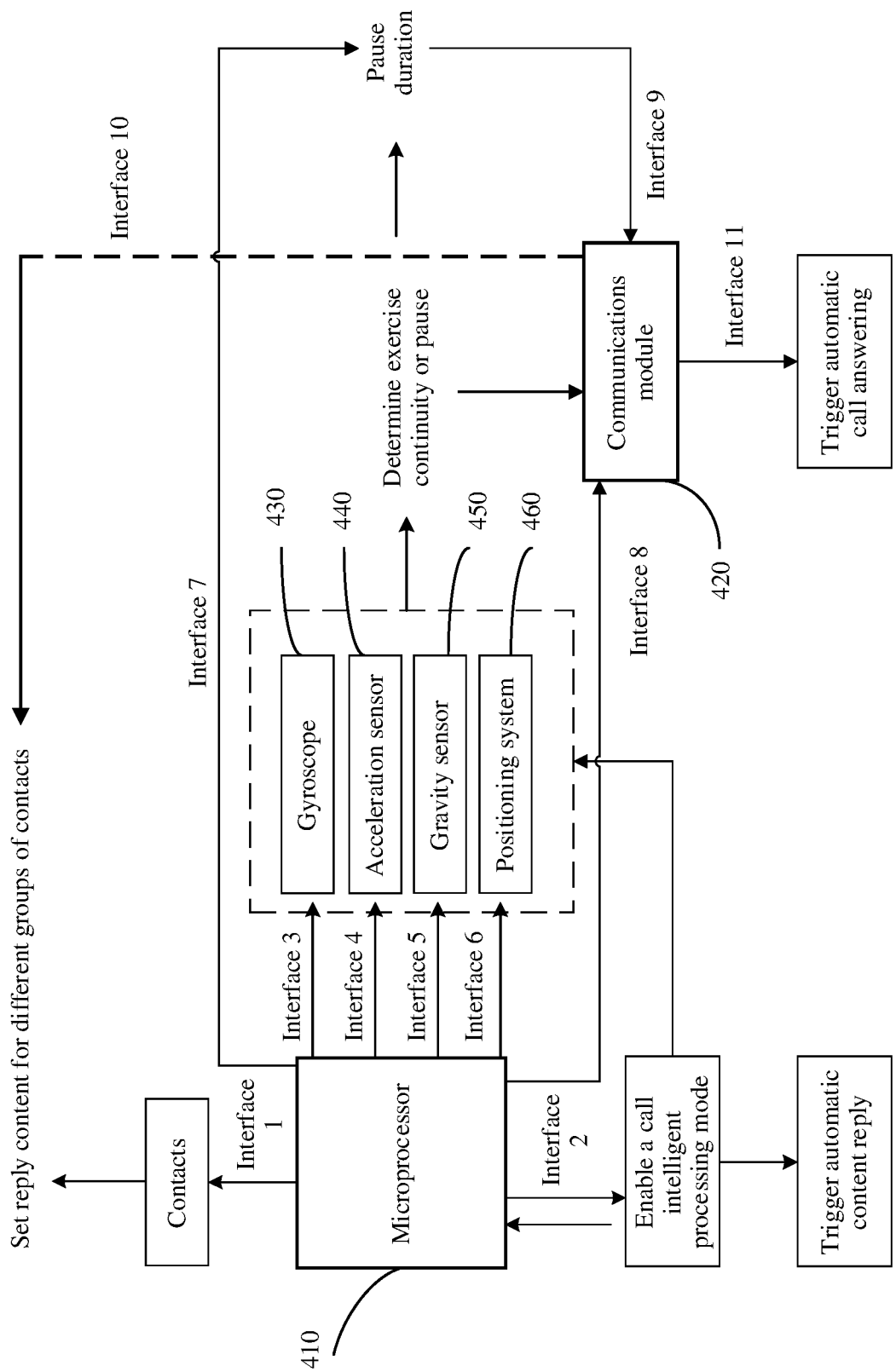
FIG. 4 is an interaction flowchart of a call processing method during exercise according to an embodiment of this application.

The following describes an exercised-based call processing method in this application in detail by using an electronic apparatus as an example. FIG. 4 shows a schematic diagram of an internal structure of an electronic apparatus and a flowchart of a call processing method of each part of the electronic device. As shown in FIG. 4, the electronic apparatus includes a microprocessor 410, a communications module 420, and four sensors. The microprocessor 410 is connected to the four sensors: a gyroscope 430, an acceleration sensor 440, a gravity sensor 450, and a positioning system 460 through four interfaces 3, 4, 5, and 6. When the microprocessor 410 determines, by using exercise data detected by the sensors, that a user starts exercising, the microprocessor 410 enables a call intelligent processing mode by using the interface 2, connects to the communications module 420 by using an interface 8, and invokes a number and a group of a call party in contacts by using the interface 1, to determine reply content preset by the user for the call party, send corresponding reply content to the number of the call party or answer a call by using the communications module 420. For example, when the microprocessor 410 determines that the user is willing to answer the call, the microprocessor 410 may invoke an interface 7 and an interface 9 to transmit the will that the user wants to answer the call to the communications module 420, and the communications module 420 triggers an answer key through an interface 11 to automatically answer the call. When the microprocessor 410 determines that the user is not willing to answer the call, the microprocessor 410 may obtain the reply content through an interface 10 and send the corresponding reply content to the number of the call party, so that the call party can learn a situation of the user in time.

In this application, the microprocessor 410 needs to make two judgments to determine that the user is willing to answer the call. As shown in FIG. 4, the microprocessor 410 may determine, by using the exercise data detected by the sensors, whether exercise of the user is continuous or paused. When determining that the exercise of the user is paused, further, the microprocessor 410 may determine, by using the interface 7, whether pause time of the user meets a condition that the user expects to answer the call. For example, the pause time is set to 5 seconds, and when the pause time of the user reaches 5 seconds, the microprocessor 410 determines that the user is willing to answer the call, and completes an automatic answering action by using the interface 9, the interface 11, and the communications module 420. The microprocessor 410 determines that the user is not willing to answer the call, which may be determined by determining that the exercise of the user is continuous for the first time, or by determining, after determining that the exercise of the user pauses for the first time, that the pause time of the user does not reach a specified 5 seconds. It should be noted that a specific parameter value in this application, for example, a pause time threshold of 5 seconds, is merely an example for description, and is not limited herein. In addition, the sensors mentioned in this application are not limited to the four types of sensors mentioned in this application, and are merely an example for description herein. This is not intended to limit this application.

Figure 5:
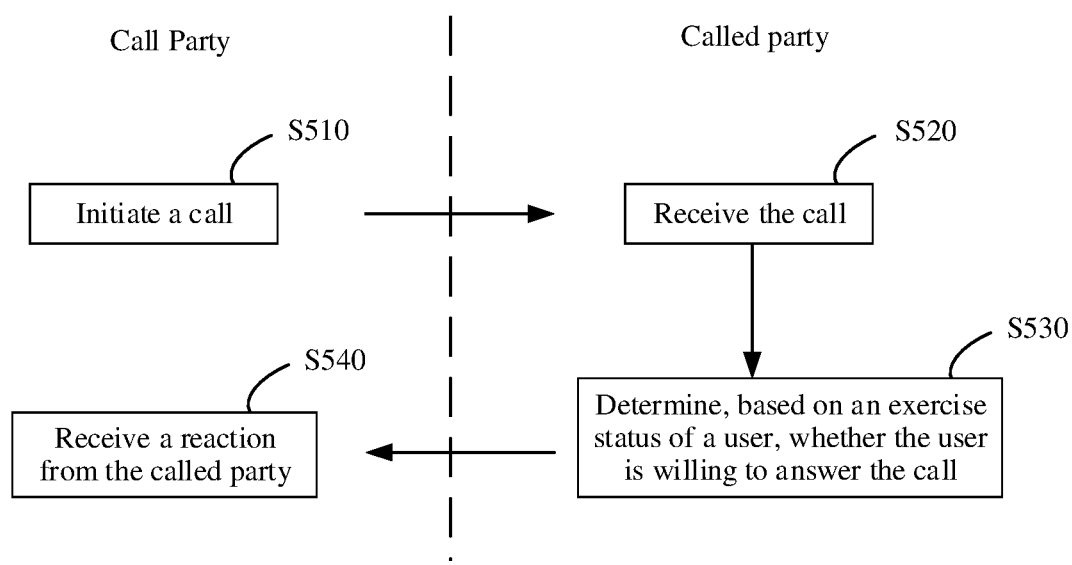
FIG. 5 is a schematic diagram of an internal structure of an electronic apparatus and a flowchart of a call processing method of each part of the electronic apparatus according to an embodiment of this application.

The following further describes a call processing method in this application in detail with reference to the accompanying drawings. FIG. 5 shows an interaction flowchart of a call processing method during exercise. The method includes an electronic apparatus of a called party and an electronic apparatus of a call party. As shown in FIG. 5, the step S220 includes the following steps.

Step 510: The call party initiates a call to the called party. For example, initiating a telephone call, a voice call, or a video call. The electronic apparatus of the called party performs the foregoing step S220, which includes step S520 and step S530, and is specifically as follows:

Step 520: The called party receives the call of the call party.

Step 530: After the called party receives the call, determine, based on an exercise status of a user, whether the user is in a first status or a second status, that is, whether the user is willing to answer the call, and react, based on what is determined, to the call party.

Step 540: The call party receives the reaction from the called party.

In this application, reacting, based on what is determined, to the call party may include the following two cases:

When it is determined that the user is willing to answer the call, the call is automatically answered, to implement a communication connection between the call party and the called party. In addition, when it is determined that the user is willing to answer the call, the electronic apparatus may enable a speaker, or connect to a headset worn by the user, so that the user communicates with the call party conveniently.

When it is determined that the user is not willing to answer the call, preset reply content is automatically replied to the call party. The preset reply content may be an SMS message edited by the user before exercising, and the user may preset and save the reply content for different call parties based on an actual situation. For example, contacts may be grouped into family members, friends, or colleagues. In the electronic apparatus, a group to which a number of the call party belongs may be identified, and a corresponding set message is replied. For example, in a family member group, the reply content for the call of a daughter may be set to "Daughter, I am swimming. Come to XX place to find me". In a colleague group and a friend group, the reply content may be set to "I am not available now. Call you later.", and the like. Alternatively, the reply content for each contact may be edited, so that the call party can receive targeted reply content. In addition, the preset reply content may further be intelligent reply content of the electronic apparatus. For example, when the user is swimming, the electronic apparatus replies that "The owner is swimming and cannot answer the call. Please leave a message or redial later". Further, the electronic apparatus may intelligently reply different content based on whether the user pauses. For example, if the user does not pause, it is considered that the owner does not hear the call or does not want to be disturbed, and "Please leave a message or redial later" is replied. If the user pauses, but pause duration does not reach preset duration, for example, 5 seconds, "The owner is swimming and cannot answer the call. Call you later." is replied. In this way, the call party can learn a status of the user in time, which avoids worry of the call party caused by not learning the status of the called party, and improves user experience.

It should be noted that, in this application, the first status is used to indicate that the user is willing to answer the call, and the second status indicates that the user is not willing to answer the call. In the following embodiments, the will to answer the call and the will not to answer the call are separately used for description. That is, the will to answer the call is the first status of the user in this application, and the will not to answer the call is the second status of the user.

In this application, whether the user is willing to answer the call is determined based on impact of a conventional reaction of the user on exercise data of the user when the user receives the call. For example, the electronic apparatus worn by the user who is running suddenly receives the call, and generally, when the user does not expect to answer the call from anyone at all, the user may ignore the call and keep a running exercise state. In this case, the call does not affect the exercise data of the user. In other words, in response to the call, the exercise data that is of exercise of a limb part of the user and that is detected by using a sensor, for example, a physical parameter (as an example of the exercise data) that is used to indicate an exercise speed of an entire body or the limb part of the user, such as an angle of arm swinging, an acceleration of gravity of the electronic apparatus, or an acceleration in a running direction, does not change greatly. If the user needs to further determine, by observing the call party on the electronic apparatus, whether to answer the call, the user usually has an action of moving the electronic apparatus close to a face and observing the electronic apparatus. In this case, a running speed of the user is affected, or an action of holding the electronic apparatus close to the face affects a swing amplitude of the arm, for example, the arm swings up suddenly, or a swing angle becomes larger. After such a change in the exercise status occurs, the electronic apparatus may measure an acceleration caused by gravity by using a gravity sensor, and calculate a tilt angle of the electronic apparatus relative to a horizontal plane, a speed change in an arm swing direction is measured by using an acceleration sensor, and the arm swing direction and the arm swing angle can be measured by using a gyroscope, so that the electronic apparatus can determine the exercise status of the user based on the exercise data. It may be understood that the exercise data generated when the user performs another action such as running or swimming is also detected by a corresponding sensor, so that the electronic apparatus learns the exercise status of the user based on the exercise data, to determine whether the user is willing to answer the call. When the user quickly restores to an original running state after observation, it may indicate that the user is not willing to answer the call. If the user does not restore to the original running state after the observation for a period of time, it may indicate that the user expects to answer the call. The foregoing mentioned exercise data in statuses such as the user quickly restores to the original running state after the observation, the user does not restore to the original running state after the observation for a period of time, and the like may be detected and recorded by the sensor of the electronic apparatus, so that the electronic apparatus determines, based on a change in the exercise data, whether the user is willing to answer the call. Based on the foregoing determining, before and after receiving the call, the electronic apparatus may continuously monitor the exercise data of the user, to determine whether the user is willing to answer the call, and further determine a will of the user, to assist the user in processing a received call and improve the user experience.

In addition, in a running process of the user, if a gravity center suddenly drops when the user squats or falls down, it is detected by the gravity sensor that the acceleration of gravity in a downward direction (that is, a gravity direction) of the user increases. If the acceleration of gravity increases again within a specified parameter of 3 seconds, and a direction of the acceleration of gravity is opposite to a direction of the acceleration of gravity before 3 seconds (an opposite direction of gravity), it may be indicated that the user stands up again. If the acceleration of gravity is always 0 m/s$^2$ in a set period of time after the set 3 seconds, a mobile terminal may determine that the user does not stand up and may be injured, in this case, a call is automatically initiated or a corresponding message is automatically sent to an emergency contact preset by the user, so that the user is better protected. Parameters in this application are merely examples for description, and are not intended to limit this application herein.

With reference to the accompanying drawings, the following describes in detail the step 530 of this application in which after the called party receives the call, determine, based on an exercise status of a user, whether the user is willing to answer the call.

Figure 6:
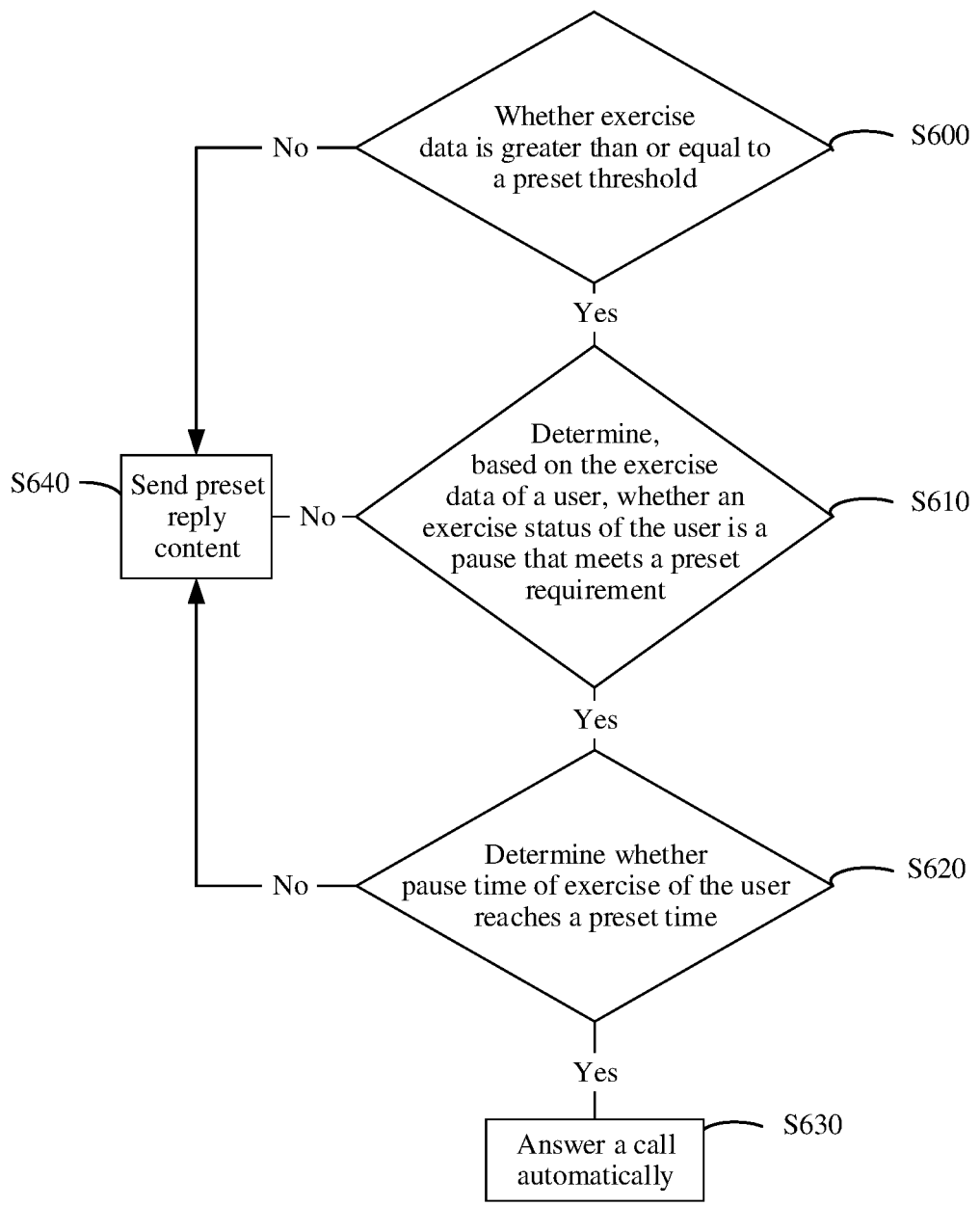
FIG. 6 is a flowchart of reacting to a call based on an exercise status of a user according to an embodiment of this application.

FIG. 6 is a flowchart of reacting to a call based on an exercise status of a user. As shown in FIG. 6, in step S530, the electronic apparatus determines whether the user is willing to answer the call, which specifically includes the following steps.

Step S600: Determine, based on the exercise data of the user, whether the exercise status of the user is continuous exercise, and when the electronic apparatus determines that the exercise status of the user is the continuous exercise, it may be directly determined that the user is not willing to answer a call. In this case, the electronic apparatus may perform step S640, that is, send the preset reply content to the call party, that is, the content edited by the user before exercising, or the intelligent reply content of the electronic apparatus. For details, refer to the descriptions in the foregoing embodiments. If the electronic apparatus determines that exercise of the user is discontinuous exercise, that is, the exercise status of the user is paused. Then, the electronic apparatus performs step S610 to further determine whether the user is willing to answer the call.

The following describes step S600 in the foregoing step S530 in detail with reference to a specific embodiment.

Refer to FIG. 4. The microprocessor 410 compares the exercise data with a preset threshold. The preset threshold may be critical exercise data between exercise continuity and pause. When the exercise data is less than the preset threshold, the microprocessor 410 determines that the user exercises continuously. When the exercise data of the user is greater than or equal to the preset threshold, the microprocessor 410 determines that the exercise of the user is discontinuous, that is, paused, where the exercise data includes a movement acceleration of the user from a moment when the electronic apparatus receives the call to a moment, for example, the swing angle and direction of the arm monitored by the gyroscope, the acceleration of gravity of the electronic apparatus detected by the gravity sensor, an acceleration in a movement direction of the user detected by the acceleration sensor, a moving distance of the user detected by the positioning system, and the like. For example, in the running state of the user, an angle at which the arm of the user swings left and right relative to a torso is usually less than 30 degrees. After the electronic apparatus receives the call, if the gyroscope detects that the angle at which the arm of the user swings is always less than 30 degrees, the exercise of the user is the continuous exercise, which indicates that the use is not willing to answer the call. Alternatively, after the electronic apparatus receives the call, it is monitored by the acceleration sensor and the gyroscope that the user always keeps the acceleration in the movement direction at 0 m/s², that is, the user is exercising at a uniform speed, which indicates that the exercise of the user is the continuous exercise. In this case, the microprocessor 410 determines that the user is not willing to answer the call, the electronic apparatus may reject the call, and send the preset reply content to the number of the call party, to avoid worry or unpleasantness caused to the call party by directly rejecting or not answering the call. It should be noted that the preset thresholds in this application may alternatively be different parameters that are set based on different exercise statuses of the user. This is merely an example for description in this application, and is not intended to limit this application.

As shown in FIG. 4 and FIG. 6, with reference to the foregoing embodiments, when the exercise data of the user is greater than or equal to the preset threshold, the microprocessor 410 determines that the exercise of the user is discontinuous, that is, paused. In this case, the microprocessor 410 performs the step S610, the microprocessor 410 may determine, based on the exercise data of the user, whether the exercise status of the user is a pause that meets a preset requirement. For example, the user wears or holds the electronic apparatus on the arm to run, and a position at which the arm swings suddenly raised. In this case, the electronic apparatus may obtain an accurate judgment based on the acceleration of gravity detected by the gravity sensor 450 or the swing angle and direction of the arm detected by the gyroscope, a change in the acceleration in the arm swing direction detected by the acceleration sensor 440. Generally, when the user is taking exercise, a central position at which the arm swings is fixed, and the gravity sensor 450 may detect that the acceleration of gravity of the electronic apparatus is 0 m/s² at this time, and a sudden raise action causes a rapid increase in the acceleration of gravity, for example, 0 m/s² is changed to 5 m/s². If the acceleration of gravity reaching 5 m/s² is regarded as the pause meeting the preset requirement, the microprocessor 410 may determine that the exercise status of the user at this time is the pause. In addition, the pause that meets the preset requirement may also be that the user is completely stationary, and the speed in the movement direction is 0 m/s. In this case, it is determined that the exercise status of the user is paused. In this application, the exercise data may be obtained by using one or more combination sensors in the gyroscope, the acceleration sensor, the gravity sensor, and the positioning system sensor. The foregoing exercise status and the corresponding threshold parameters are merely examples for description, and are not limited herein.

The following uses an example in which a smart communications watch is used as an electronic apparatus to describe how the electronic apparatus determines that exercise of a user is discontinuous. The communications watch is worn on a wrist of the user. When the user runs, an arm drives the wrist to swing regularly and continuously, and a gyroscope, a gravity sensor, and an acceleration sensor of the watch will record an angle, a direction, and a speed of the regular swing. When the watch receives a call, and if the user raises the arm to observe an interface of the watch, the sensors of the watch will identify and record this instantaneous action. Because the arm swings regularly during running and the swing angle of the three-dimensional space changes when the arm is raised, if a change in the swing angle of the arm is used as a basis for making a judgment, the watch may compare an angle at which the arm swings left or right relative to a torso of the user with a preset threshold 30 degrees in the watch, to determine whether the user is observing the smart communications watch. For example, when the user is running, normally, a value of the angle at which the arm of the user swings relative to the torso should be less than 30 degrees. After ringing, if the angle at which the arm is raised and swings is greater than 30 degrees, it indicates that the user is raising the arm to watch the interface of the smart communications watch, and a pause that meets a requirement of the user is determined. In this application, whether the user is willing to answer a call is determined based on a body movement status of the user, so that good experience can be brought to the user. It should be noted that exercise status of the user may be determined based on a plurality of pieces of exercise data detected by a plurality of sensors, to improve accuracy of making the judgment. The example herein is merely an example for description, and is not intended to limit this application.

As shown in FIG. 4 and FIG. 6, when the microprocessor 410 determines that the exercise status of the user is the pause that meets the preset requirement, step S620 is further performed, that is, determine whether the pause time of the exercise of the user meets preset time for which the user is willing to answer, for example, preset time of 5 seconds preset in the electronic apparatus. Take the arm swing in the foregoing embodiments as an example. When it is monitored by the gravity sensor 450 that the acceleration of gravity of the arm swing suddenly changes from 0 m/s² to 5 m/s², the arm of the user remains still. Based on the descriptions of the foregoing embodiments, it indicates that the user is viewing the call party shown on the electronic apparatus, at this time, the acceleration of gravity changes from 5 m/s² to 0 m/s², and a moment when the acceleration of gravity changes from 5 m/s² to 0 m/s² is used as a start of pause timing. If the acceleration of gravity is 0 and remains for 5 seconds, that is, the pause time reaches the preset time of 5 seconds, and in this case, the microprocessor 410 determines that the user is willing to answer the call. Then, the microprocessor 410 may invoke the interface 11 by using the communications module 420 and trigger the answer key to answer the call automatically, which can further improve a judgment of whether the user is willing to answer the call.

When the microprocessor 410 determines that the pause time of the exercise of the user does not reach the preset time of 5 seconds, the microprocessor 410 determines that the user is not willing to answer the call. For example, description is provided in combination with the arm swing in the foregoing embodiments. After it is monitored by the gravity sensor 450 that the acceleration of gravity of the arm suddenly changes from 0 m/s² to 5 m/s², and after the arm of the user keeps still for 4 seconds, the acceleration of gravity suddenly increases and reaches 6 m/s², which shows that the pause time of the user is 4 seconds, and the pause time of 4 seconds does not reach a requirement of the preset time of 5 seconds, the microprocessor 410 determines that the user is not willing to answer the call, and sends an SMS message to the call party, where content of the SMS message may be the reply content edited by the user for different contacts. For example, the microprocessor 410 invokes the number and group of the call party in the contacts by using the interface 1, to determine the reply content preset by the user for the call party, obtain the reply content by using the interface 10, and send the corresponding reply content to the number of the call party, so that the call party can learn the situation of the user in time, and good experience is brought to both parties.

The call processing method during exercise in this embodiment of this application automatically determines the exercise status of the user and a processing intention of the user for the call during exercise, and assists the user, based on the processing intention of the user, in answering the call or sending the reply content. In this way, the following case can be avoided, in which the call party is worried about receiving no timely reaction, and the called party can react in time in two processing manners: being willing to answer or rejecting the call, which improves experience of both parties.

Figure 7:
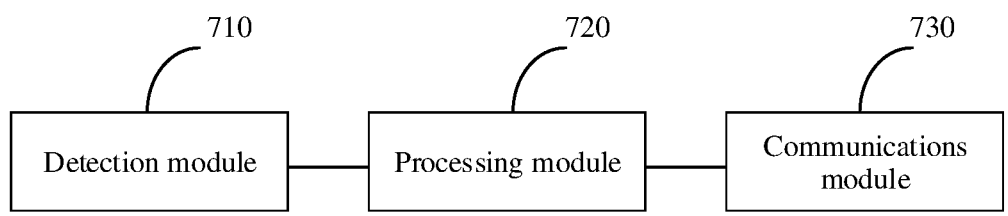
FIG. 7 is a schematic diagram of a structure of an electronic apparatus according to an embodiment of this application.

Based on the foregoing descriptions, the following specifically describes an electronic apparatus for call processing in this application. The electronic apparatus is configured to execute the foregoing method embodiments. FIG. 7 is a schematic diagram of a structure of an electronic apparatus. As shown in FIG. 7, the electronic apparatus includes:

A detection module 710, configured to obtain exercise data of a user, where the exercise data is used to represent a current exercise status of the user, and the detection module may include one or more combination sensors in a gravity sensor, a gyroscope, an accelerometer, or a positioning system.

A processing module 720. When the processing module receives a call, the electronic apparatus determines, based on the current exercise status of the user, and performs, by using a communications module 730, a processing action corresponding to a current call, by using a communications module 730, a processing action corresponding to a current call, where the corresponding processing action may include directly rejecting the call and then sending corresponding reply content to a number of the call; answer the call, or the like.

According to an embodiment of this application, the processing module 720 determines, by using a sensor, whether the user starts exercising, and when it is determined that the user starts exercising, enables a call intelligent processing mode, so that the electronic apparatus can automatically process a received call.

According to an embodiment of this application, that when the electronic apparatus receives the call, the processing module determines, based on the current exercise status of the user, an action corresponding to the current call further includes: The processing module determines, based on the exercise status of the user, whether the user is willing to answer the call, and when it is determined that the user is in a first status, that is, the user is willing to answer the call, automatically answers the call. When it is determined that the user is in a second status, that is, the user is not willing to answer the call, reply content preset by the user is automatically replied to a call party, where the reply content may be correspondingly set based on a relationship between a contact and the user. For example, in a family member group divided, the reply content for the call of a daughter may be set to "daughter, I am swimming. Come to XX place to find me". In a colleague group and a friend group, the reply content may be set to "I am not available now. Call you later."

According to an embodiment of this application, the electronic apparatus further includes a storage module, where the storage module stores the reply content for different call parties preset by the user.

According to an embodiment of this application, the processing module 720 is specifically configured to: determine, based on the exercise data of the user, whether the exercise status of the user is a pause that meets a preset requirement, when it is determined that the exercise status of the user is the pause that meets the preset requirement, further determine whether pause time of exercise of the user reaches preset time, and when the pause time reaches the preset time, determine that the user is in the first status; that is, the user is willing to answer the call.

According to an embodiment of this application, the processing module 720 is specifically configured to: when the pause time of the exercise of the user does not reach the preset time, determine that the user is in the second status, that is, the user is not willing to answer the call.

According to an embodiment of this application, the processing module 720 is specifically configured to: determine whether the exercise data is greater than or equal to a preset threshold; and when the exercise data of the user is greater than or equal to the preset threshold, determine that the exercise status of the user is the pause.

According to an embodiment of this application, the processing module 720 is specifically configured to: determine, based on the exercise data of the user, whether the exercise status of the user is continuous exercise meeting the preset requirement; and when it is determined that the exercise status of the user is the continuous exercise, determine that the user is in the second status, that is, the user is not willing to answer a call.

According to an embodiment of this application, the processing module 720 is specifically configured to: determine whether the exercise data is less than the preset threshold, and when the exercise data of the user is less than the preset threshold, determine that the exercise of the user is the continuous exercise.

A specific working process of the electronic apparatus in this application is described in detail in the foregoing embodiments. For details, refer to the method in the foregoing embodiments. Details are not described herein again.

The electronic apparatus in this embodiment of this application automatically determines the exercise status of the user and a processing intention of the user for the call during exercise, and assists the user, based on the processing intention of the user, in answering the call or sending the reply content. In this way, the following case can be avoided, in which the call party is worried about receiving no timely reaction, and the called party can react in time in two processing manners: being willing to answer or rejecting the call, which improves experience of both parties.

Figure 8:
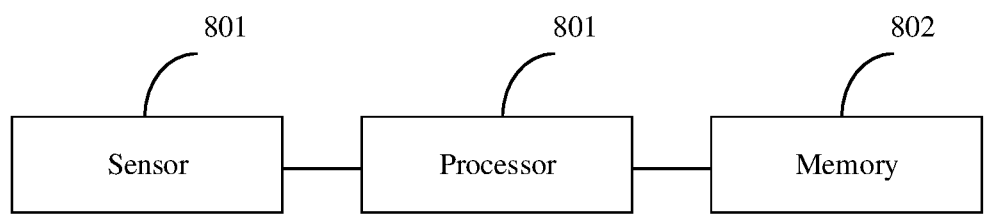
FIG. 8 is a schematic diagram of a structure of an electronic device according to an embodiment of this application.

This application further provides an electronic device. As shown in FIG. 8, the electronic device includes a processor 801, a memory 802, and a sensor 803. The sensor 803 is configured to obtain exercise data of a user, and the exercise data is used to represent a current exercise status of the user, where the sensor may include one or more combination sensors in a gravity sensor, a gyroscope, an accelerometer, or a positioning system.

The memory 802 stores computer program instructions. When the computer program instructions are run by the processor 801, the processor 801 is enabled to perform the following step: when a call is received, determine and perform, based on the current exercise status of the user, a processing action corresponding to a current call. A corresponding processing action may include directly rejecting the call and then sending corresponding reply content to a call number, answering the call, or the like. For the specific steps performed, refer to the foregoing embodiments. Details are not described herein again.

Figure 9:
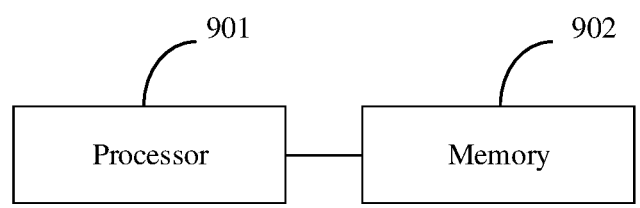
FIG. 9 is a schematic diagram of a structure of a chip according to an embodiment of this application.

This application further provides a chip. The chip is used in the apparatus and the electronic device in the foregoing embodiments. As shown in FIG. 9, the chip includes a processor 901 and a memory 902. The memory may include one or more computer-readable media configured to store code or a program. The computer-readable storage medium may store instructions. Specifically, temporary and permanent copies of the instructions are stored. The processor 901 is configured to execute the instructions stored in the memory 902. The instructions may include: When a central processing unit executes the instructions, the chip is enabled to execute the exercise-based call processing method in the foregoing embodiments. For details, refer to the method described in FIG. 2 to FIG. 6 in the foregoing embodiments, and details are not described herein again.

Figure 10:
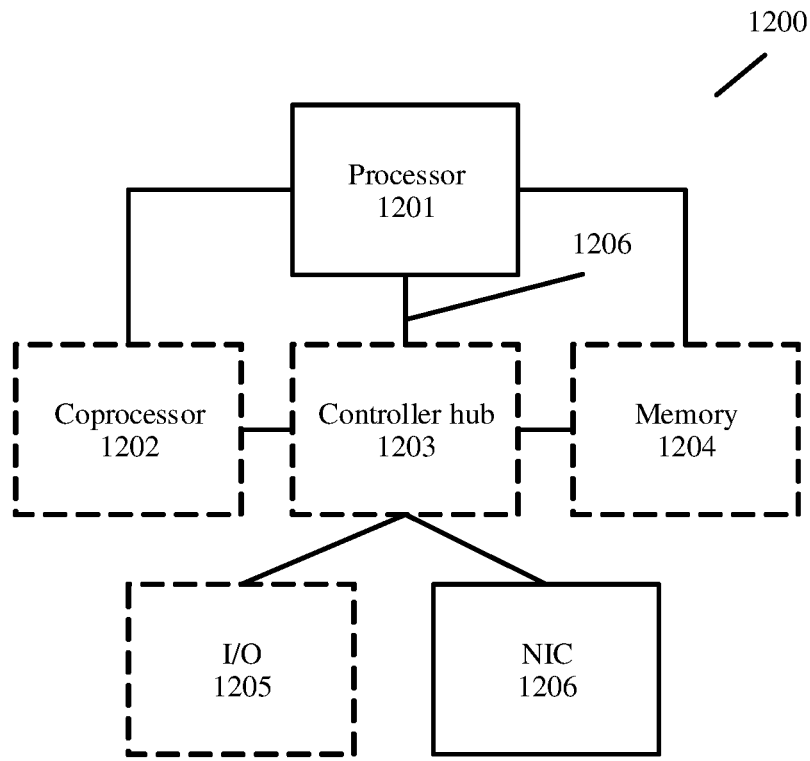
FIG. 10 is a block diagram of a device according to some embodiments of this application.

FIG. 10 shows a block diagram of a device 1200 according to an embodiment of this application. The device 1200 may include one or more processors 1201 coupled to a controller hub 1203. For at least one embodiment, the controller hub 1203 communicates with the processor 1201 by using a multi-branch bus such as a front side bus (Front Side Bus, FSB), a point-to-point interface such as a quick path interconnect (Quick Path Interconnect, QPI) interface, or a similar connection 1206. The processor 1201 executes instructions for controlling a general type of data processing operation. In an embodiment, the controller hub 1203 includes, but is not limited to, a graphics memory controller hub (Graphics Memory Controller Hub, GMCH) (not shown) and an input/output hub (Input Output Hub, IOH) (which may be on a separate chip) (not shown). The GMCH includes a memory and a graphics controller, and is coupled to the IOH.

The device 1200 may further include a coprocessor 1202 and a memory 1204 that are coupled to the controller hub 1203. Alternatively, one or both of the memory and the GMCH may be integrated into the processor (as described in this application). The memory 1204 and the coprocessor 1202 are directly coupled to the processor 1201 and the controller hub 1203. The controller hub 1203 and the IOH are located in a single chip. The memory 1204 may be, for example, a dynamic random access memory (Dynamic Random Access Memory, DRAM), a phase change memory (Phase Change Memory, PCM), or a combination of both. In an embodiment, the coprocessor 1202 is an application-specific processor, for example, a high-throughput MIC (Many Integrated Core, MIC) processor, a network or communication processor, a compression engine, a graphics processing unit, a general-purpose graphics processing unit (General Purpose Computing on GPU, GPGPU), or an embedded processor. An optional property of the coprocessor 1202 is shown in FIG. 10 in dashed lines.

As a computer-readable storage medium, the memory 1204 may include one or more tangible non-transitory computer-readable media that are configured to store data and/or instructions. For example, the memory 1204 may include any suitable nonvolatile memory such as a flash memory and/or any suitable nonvolatile storage device, for example, one or more hard-disk drives (Hard-Disk Drive, HDD (s)), one or more compact disc (Compact Disc, CD) drives, and/or one or more digital versatile disc (Digital Versatile Disc, DVD) drives.

In an embodiment, the device 1200 may further include a network interface (Network Interface Controller, NIC) 1206. The network interface 1206 may include a transceiver, configured to provide a radio interface for the device 1200, to communicate with any another suitable device (such as a front-end module or an antenna). In various embodiments, the network interface 1206 may be integrated with another component of the device 1200. The network interface 1206 may implement a function of a communication unit in the foregoing embodiments.

The device 1200 may further include an input/output (Input/Output, I/O) device 1205. The I/O 1205 may include: a user interface designed to enable a user to interact with the device 1200; a peripheral component interface designed to enable a peripheral component to interact with the device 1200; and/or a sensor designed to determine an environmental condition and/or location information related to the device 1200.

It should be noted that FIG. 10 is merely an example. In other words, although FIG. 10 shows that the device 1200 includes a plurality of components such as the processor 1201, the controller hub 1203, and the memory 1204, in actual application, a device that uses the methods in this application may only include some of the components of the device 1200, for example, may only include the processor 1201 and the NIC 1206. In FIG. 10, properties of the optional components are shown by using dashed lines.

According to some embodiments of this application, the memory 1204 that is used as a computer-readable storage medium stores instructions. When the instructions are executed on a computer, the system 1200 is enabled to perform the method in the foregoing embodiments. For details, refer to the method in the foregoing embodiments. Details are not described herein again.

Figure 11:
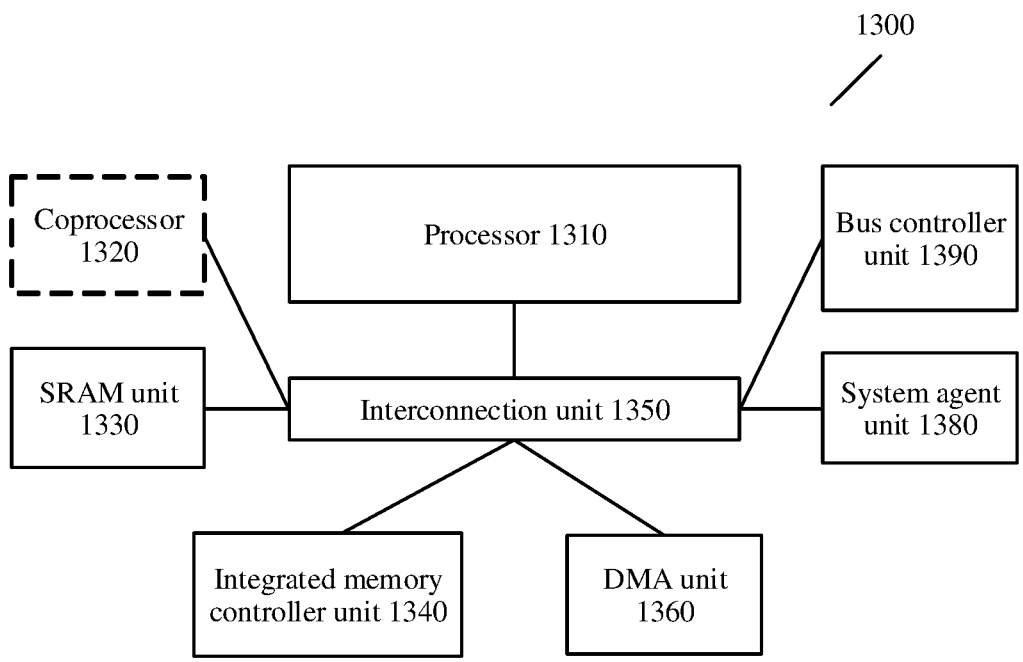
FIG. 11 is a block diagram of a system on chip (SoC) according to some embodiments of this application.

FIG. 11 shows a block diagram of a SoC (System on Chip, System on Chip) 1300 according to an embodiment of this application. In FIG. 11, similar parts have a same reference numeral. In addition, a dashed-line box is an optional feature of a more advanced SoC. In FIG. 11, the SoC 1300 includes: an interconnection unit 1350 that is coupled to an application processor 1310; a system agent unit 1380; a bus controller unit 1390; an integrated memory controller unit 1340; one group of coprocessors 1320 or one or more coprocessors 1320 that may include integrated graphics logic, an image processing unit, an audio processor, and a video processor; a static random access memory (Static Random Access Memory, SRAM) unit 1330; and a direct memory access (DMA) unit 1360. In an embodiment, the coprocessor 1320 includes an application-specific processor, for example, a network or communication processor, a compression engine, a GPGPU, a high-throughput MIC processor, or an embedded processor.

The static random access memory (SRAM) unit 1330 may include one or more computer-readable media for storing data and/or instructions. The computer-readable storage medium may store instructions, and specifically, store temporary and permanent copies of the instructions. The instructions may include the following: When being executed by at least one unit in the processor, the instructions enables the SoC1300 to execute the exercise-based call processing method in the foregoing embodiments. For details, refer to the method in the foregoing embodiments, and details are not described herein again.

Embodiments of mechanisms disclosed in this application may be implemented in hardware, software, firmware, or a combination of these implementation methods. Embodiments of this application may be implemented as a computer program or program code that is executed on a programmable system, and the programmable system includes at least one processor, a storage system (including volatile and nonvolatile memory and/or a storage element), at least one input device, and at least one output device.

The program code may be configured to input instructions, to perform functions described in this application and generate output information. The output information may be applied to one or more output devices in a known manner. For a purpose of this application, a processing system includes any system that has a processor such as a digital signal processor (Digital Signal Processor, DSP), a microcontroller, an application-specific integrated circuit (Application-Specific Integrated Circuit, ASIC), or a microprocessor.

The program code may be implemented in a high-level procedural language or an object-oriented programming language, to communicate with the processing system. The program code may alternatively be implemented by using an assembly language or a machine language when needed. Actually, the mechanisms described in this application are not limited to a scope of any particular programming language. In any case, the language may be a compiled language or an interpretive language.

In some cases, the disclosed embodiments may be implemented by hardware, firmware, software, or any combination thereof. The disclosed embodiments may be alternatively implemented as instructions carried by or stored on one or more temporary or non-temporary machine-readable (for example, computer-readable) storage media, and the instructions may be read and executed by one or more processors. For example, the instructions may be distributed through a network or another computer-readable medium. Therefore, the machine-readable medium may include any mechanism for storing or transmitting information in a machine (for example, a computer)-readable form. The machine-readable medium includes but is not limited to a floppy disk, an compact disc, an optical disc, a compact disc read-only memory (Compact Disc Read-Only Memory, CD-ROMs), a magneto-optical disc, a read-only memory (Read-Only Memory, ROM), random access memory (RAM), erasable programmable read-only memory (Erasable Programmable Read-Only Memory, EPROM), electrically erasable programmable read-only memory (Electrically Erasable Programmable Read-Only Memory, EEPROM), a magnetic or an optical card, a flash memory, or a tangible machine-readable memory that is configured to transmit information through Internet by using electricity, light, sound or another form of propagating signal (for example, carrier, an infrared signal, or a digital signal). Therefore, the machine-readable medium includes any type of machine-readable medium that is suitable for storing or transmitting electronic instructions or information in a machine (for example, a computer)-readable form.

According to an embodiment of this application, a computer-readable storage medium stores a computer program. When the computer program is run on an electronic device, the electronic device is enabled to perform the method described in the foregoing method embodiments. For details, refer to the foregoing embodiments, and details are not repeated here any further.

According to an embodiment of this application, instructions are included in a computer program product. When the computer program product runs on an electronic device, the electronic device is enabled to perform the method described in the foregoing method embodiments.

In the accompanying drawings, some structural or method features may be shown in a particular arrangement and/or order. However, it should be understood that such a particular arrangement and/or order may not be required. In some embodiments, these features may be arranged in a manner and/or order different from that shown in the accompanying drawings of the specification. In addition, inclusion of the structural or method features in a particular figure does not imply that such features are required in all embodiments, and in some embodiments, these features may not be included or may be combined with other features.

It should be noted that all units/modules mentioned in the device embodiments of this application are logical units/modules. Physically, one logical unit/module may be one physical unit/module, or may be a part of one physical unit/module, or may be implemented by a combination of a plurality of physical units/modules. Physical implementations of these logical units/modules are not the most important, and a combination of functions implemented by these logical units/modules is a key to resolving technical problems proposed in this application. In addition, to highlight an innovative part of this application, a unit/module that is not closely related to resolving the technical problems proposed in this application is not introduced in the foregoing device embodiments of this application. This does not indicate that there is not another unit/module in the foregoing device embodiments.

It should be noted that, in examples and the specification of this patent, relational terms such as first and second are only used to distinguish one entity or operation from another entity or operation, and do not necessarily require or imply that any actual relationship or sequence exists between these entities or operations. Moreover, a term "include", "contain", or any other variant is intended to cover non-exclusive inclusion, so that a process, a method, an article, or a device that includes a series of elements not only includes those elements but also includes other elements that are not expressly listed, or further includes elements inherent to such a process, method, article, or device. An element preceded by "includes a . . . " does not, without more constraints, preclude the existence of additional identical elements in the process, method, article, or device that includes the element.

Although this application has been illustrated and described with reference to some preferred embodiments of this application, a person of ordinary skill in the art should understand that various changes may be made to this application in form and detail without departing from the spirit and scope of this application.

What is claimed is:

1. An exercise-based call processing method, comprising:
    obtaining exercise data, detected by at least one sensor, of a user;
    determining an exercise status of the user of an electronic apparatus, wherein the exercise data is used to represent a current exercise status of the user;
    determining, based on a system in which the electronic apparatus is located, when the electronic apparatus receives a call, and based on a determined current exercise status of the user, a processing action responding to a current call; and
    automatically answering the current call, based on determining, by the electronic apparatus, based on the exercise status of the user, that the user is in a first status, wherein determining, by the electronic apparatus, based on the exercise status of the user, that the user is in a first status comprises:
        determining, based on the exercise data of the user, whether the exercise status of the user is a pause meeting a preset requirement;
        determining, based on determining that the exercise status of the user is the pause meeting the preset requirement, whether a pause time of exercise of the user reaches a preset time; and
        determining, based on the pause time reaching the preset time, that the user is in the first status.

2. The method according to claim 1, further comprising:
    determining, by the electronic apparatus, based on the exercise data, whether the user starts exercising; and
    indicating, based on determining that the user starts exercising, to enable a call intelligent processing mode.

3. The method according to claim 1, further comprising:
    automatically replying to a call party with preset reply content, based on determining, by the electronic apparatus, based on the exercise status of the user, that the user is in a second status, wherein the first status and the second status are different.

4. The method according to claim 3, wherein the preset reply content comprises reply content preset by the user.

5. The method according to claim 3, wherein determining, by the electronic apparatus, based on the exercise status of the user, that the user is in a second status comprises:
    determining, based on the pause time of the exercise of the user not having reached the preset time, that the user is in the second status.

6. The method according to claim 3, wherein the preset reply content comprises reply content pre-stored by the electronic apparatus.

7. The method according to claim 1, wherein:
    the electronic apparatus is a mobile phone; or
    the electronic apparatus is a chip, and the system in which the electronic apparatus is located is a mobile terminal in which the chip is located.

8. An electronic apparatus, comprising:
    at least one receiver, configured to obtain exercise data of a user, wherein the exercise data is used to represent a current exercise status of the user; and
    at least one processor, configured to:
        determine the current exercise status of the user based on the exercise data of the user obtained by the receiver;
        determine, based on a system in which the electronic apparatus is located, when the electronic apparatus receives a call, and based on the current exercise status of the user, a processing action responding to a current call; and
    automatically answering the current call, based on determining, based on the current exercise status of the user, that the user is in a first status, wherein determining, based on the current exercise status of the user, that the user is in a first status comprises:
        determining, based on the current exercise status of the user, whether the current exercise status of the user is a pause meeting a preset requirement;
        determining, based on determining that the current exercise status of the user is the pause meeting the preset requirement, whether pause time of exercise of the user reaches a preset time; and
        determining, based on the pause time reaching the preset time, that the user is in the first status.

9. The electronic apparatus according to claim 8, wherein the at least one processor is further configured to:
    indicate, based on determining, based on the obtained exercise data, that the user starts exercising, to enable a call intelligent processing mode.

10. The electronic apparatus according to claim 8, further comprising:
    automatically replying to a call party with preset reply content, based on determining, based on the current exercise status of the user, that the user is in a second status.

11. The electronic apparatus according to claim 10, wherein determining, based on the current exercise status of the user, that the user is in a second status comprises:
    determining, based on the pause time of the exercise of the user not having reached the preset time, that the user is in the second status.

12. The electronic apparatus according to claim 10, wherein the preset reply content comprises reply content preset by the user or reply content pre-stored by the electronic apparatus.

13. The electronic apparatus according to claim 8, wherein:
    the electronic apparatus is a chip, and the system in which the electronic apparatus is located is a mobile terminal in which the chip is located.

14. A non-transitory computer-readable storage medium storing a program to be executed by at least one processor, the program including instructions to:
    obtain exercise data, detected by at least one sensor, of a user;
    determine an exercise status of the user of an electronic apparatus, wherein the exercise data is used to represent a current exercise status of the user;
    determine, based on a system in which the electronic apparatus is located, when the electronic apparatus receives a call, and based on a determined current exercise status of the user, a processing action responding to a current call; and automatically answer the current call, based on determining, by the electronic apparatus, based on the exercise status of the user, that the user is in a first status, wherein the instructions to determine, based on the exercise data of the user, whether the exercise status of the user is a pause meeting a preset requirement include instruction to;

determine, based on determining that the exercise status of the user is the pause meeting the preset requirement, whether a pause time of exercise of the user reaches a preset time; and determine, based on the pause time reaching the preset time, that the user is in the first status.

15. The computer-readable storage medium according to claim 14, wherein the instructions further include instructions to:

determine, based on the exercise data, whether the user starts exercising; and indicate, based on determining that the user starts exercising, to enable a call intelligent processing mode.

16. The computer-readable storage medium according to claim 14, wherein the instructions further include instructions to:

automatically reply to a call party with preset reply content, based on determining, by the electronic apparatus, based on the exercise status of the user, that the user is in a second status, wherein the first status and the second status are different.

17. The computer-readable storage medium according to claim 16, wherein the preset reply content comprises reply content preset by the user or reply content pre-stored by the electronic apparatus.

18. The computer-readable storage medium according to claim 16, wherein the instructions further include instructions to:

determine, based on the pause time of the exercise of the user not having reached the preset time, that the user is in the second status.

\* \* \* \* \*